(12) United States Patent
Aureli (10) Patent No.: US 7,895,290 B2
(45) Date of Patent: Feb. 22, 2011

(54) SYSTEM FOR TRANSMITTING AND REMOTELY MANAGING DATA OF A MACHINE

(75) Inventor: Alfredo Aureli, Rimini (IT)

(73) Assignees: Robopac S.p.A., Falciano, San Marino (IT); Aetna Group S.p.A., Villa Verucchio (RN) (IT)

( * ) Notice: Subject to any disclaimer, the term of this patent is extended or adjusted under 35 U.S.C. 154(b) by 94 days.

(21) Appl. No.: 12/085,526

(22) PCT Filed: Nov. 24, 2006

(86) PCT No.: PCT/EP2006/011270
§ 371 (c)(1), (2), (4) Date: Jul. 31, 2008

(87) PCT Pub. No.: WO2007/059981
PCT Pub. Date: May 31, 2007

(65) Prior Publication Data
US 2009/0062930 A1    Mar. 5, 2009

(30) Foreign Application Priority Data
Nov. 25, 2005   (IT) .......................... MO2005A0312

(51) Int. Cl.
*G06F 15/16* (2006.01)
*G06F 12/00* (2006.01)
(52) U.S. Cl. ...................................... 709/217; 709/218
(58) Field of Classification Search ................. 709/203, 709/217–219, 227–229, 250
See application file for complete search history.

(56) References Cited

U.S. PATENT DOCUMENTS

| | | | |
|---|---|---|---|
| 6,729,005 B1 | 5/2004 | Fox et al. | |
| 2002/0059241 A1* | 5/2002 | Van Ryzin | 707/10 |
| 2004/0015383 A1* | 1/2004 | Rathjen et al. | 705/8 |
| 2005/0071124 A1 | 3/2005 | Komatsu | |

FOREIGN PATENT DOCUMENTS

| | | |
|---|---|---|
| EP | 1 139 636 | 10/2001 |
| EP | 1 215 549 | 6/2002 |
| WO | 00/49471 | 8/2000 |
| WO | 01/01366 | 1/2001 |

OTHER PUBLICATIONS

International Search Report for PCT/EP2006/011270, mailed Apr. 27, 2007.

* cited by examiner

*Primary Examiner*—Zarni Maung
(74) *Attorney, Agent, or Firm*—Nixon & Vanderhye P.C.

(57) ABSTRACT

A system for transmitting and remotely managing data of a machine selected in a group comprising a packaging machine, a wrapping machine, a wood working machine tool, comprises a processing and exchanging data device communicating with a remote processing arrangement through a first communication network, wherein an intermediate processing device is interposed between said processing and exchanging data device and said remote processing arrangement so that transfer of said data between said processing and exchanging data device and said remote processing arrangement is achieved.

13 Claims, 5 Drawing Sheets

SYSTEM FOR TRANSMITTING AND REMOTELY MANAGING DATA OF A MACHINE

CROSS-REFERENCE TO RELATED APPLICATIONS

This application is the U.S. national phase of International Application No. PCT/EP2006/011270, filed 24 Nov. 2006, which designated the U.S. and claims priority to Italy Patent Application No. MO2005A000312, filed 25 Nov. 2005, the entire contents of each of which are hereby incorporated by reference.

The present invention relates to a system for transmitting and remotely managing data of a machine, in particular functioning data of a packaging machine for wrapping products with films of extendible and/or heat-shrinking plastic material, or a wood working machine tool. Systems and methods are known for transmitting data that connect a control device of a machine to a remote processing unit, in order to enable operating and functional data to be exchanged. Typically, the control device of the machine, which comprises for example a programmable logic controller (PLC) or a personal computer (PC), processes the digital and analogic signals coming from sensors and actuator of the machine and sends to the remote processing unit, i.e. operator computer or a company server, data comprising parameters and operating and/or manufacturing conditions of said machine. The remote unit sends data comprising settings and operating configurations of the machine.

Such data flow enables the machine to be remotely controlled and monitored so as to realise remote service and remote maintenance.

By means of said systems for transmitting data it is actually possible, during connection, both to monitor the machine operation and to remotely operate on said machine in the case of anomalies and malfunctions, thus eliminating or remarkably reducing the need of direct service on place by technicians. In this way it is possible to reduce costs of technical service and duration of machine stops required for maintenance.

Said systems for transmitting data operate through private or public communication lines or network that directly connect the control device of the machine with the remote processing unit.

A private communication line is a dedicated line for data, i.e. an analogic or digital phone line, hardwired or wireless, which enables a point-to-point connection. Such solution allows having high speed and security in data transmission, against high costs for installation and/or operation.

A public communication line, for example the Internet web, enables to reduce the costs and, at the same time, to have good performances in data transmission.

TCP/IP architecture of the Internet enables data to be easily transferred, by means of suitable services. For example, standard transfer protocol FTP (File Transfer Protocol) can be used to share files between hosts or remote computers and to transfer data in a reliable and effective way.

By means of a private network VPN (Virtual Private Network) inside Internet, a connection can be provided between remote units o a company intranet. The transmission security is assured by suitable cryptographic systems.

In any case, apart from the communication lines used, the known transmission systems provide the use of a transceiver unit, i.e. a modem unit, for connecting a data processing device and a storing arrangement of the machine with an external communication line.

The data processing device enables a connection with the external communication line, data retrieval and transmission, data display and storage in the storing arrangement. Furthermore, said data processing device enables the remote unit to directly access data on the machine. Generally, such processing device comprises a PC computer whereon suitable software programs are installed for managing the flow of input and output data, i.e. for managing the direct connection with the remote unit. For example, specific programs are required for realising a connection through VPN or HTTP tunneling and/or for encrypting data.

The storing arrangement, typically one or more hard disks, are necessary both for storing said software programs and for saving data relating to functioning and production of the machine, said data to be partially or fully sent to the remote processing unit. Such systems for transmitting data nevertheless require very expensive hardware and software.

For that reason, said systems are generally installed on fully automated machines, very complex and expensive. Actually, in the case of simple machines, having reduced dimensions and costs, such as packaging machines for wrapping products with extendible and/or heat-shrinking plastic film, the cost of such systems for transmitting data can considerably weigh upon the overall cost of the machine, so that their use does not result economic and commensurate.

Another drawback of the known systems for transmitting data consists in that the they provide a direct access to the processing device of the machine, which access can be not enough protected in terms of data integrity and security. A direct access can be seriously exposed to possible intrusions by non-authorised users.

A further drawback of such known systems consists in that they requires recording data of the machine on a local storing device, with the risk, in the case of failure or malfunction, of losing data relating at least to the period of time intercurrent between the failure and the last complete transmission to the remote unit.

It is an object of the present invention to improve the systems for transmitting and remotely managing data of a machine, such as packaging machines for wrapping with films of extendible and/or heat-shrinking plastic material or a wood working machine tool. Another object is to provide a system for transmitting and managing operating and functional data of a machine that enable all said data to be sent, received, saved, analysed and modified in a simple and reliable manner.

A further object is to provide a system that assures a high security degree in data transmitting and managing, and in connecting and controlling different functionalities of the system.

Another object is to provide a system for transmitting and managing data relating to machine operating life so as to define in exhaustive and complete manner the operating state of the machine at any instant of time.

A further object is to provide a system for transmitting and managing data that is efficient, with high performances and, at the same time, economic and easy to be implemented on the machine.

In a first aspect of the invention a system is provided for transmitting and remotely managing data of a machine selected in a group comprising a packaging machine, a wrapping machine, a wood working machine tool, comprising a processing and exchanging data device communicating with a remote processing arrangement through a first communication network, wherein an intermediate processing device is interposed between said processing and exchanging data device and said remote processing arrangement so that transfer of said data between said processing and exchanging data device and said remote processing arrangement is achieved.

Owing to this aspect of the invention, a system can be realised for transmitting and remotely managing data of a packaging machine or wood working machine tool, which assures a high security degree in transmitting and exchanging data. The system of the invention does not allow the remote processing arrangement to directly access to the processing and exchanging data device of the machine, but enables data exchange only through the intermediate processing device, whose access can be easily and effectively controlled and protected. In addition, by using as first communication network the Internet and as intermediate processing device a web server device, said system makes possible to transmit and to manage data in efficient manner and with high performances, by using hardware and software components that are economic and easy to be implemented on the machine.

In a second aspect of the invention a system is provided for transmitting and remotely managing data of a machine, comprising a modem unit of a processing and exchanging data device communicating with a remote processing arrangement, wherein, a processing unit of said modem unit is common to a control device which controls operation of said machine.

Owing to this aspect of the invention, it is possible to simplify the structure of the processing and exchanging data device and to reduce the cost thereof. The processing unit of modem unit can be use in fact both for transmitting and receiving data and for controlling operation of the machine. Furthermore, the modem unit may operate without the storing arrangement for recording said data, since it is configured to transmit said data individually or in group, continuously or at defined intervals of time, which can be adjusted at will. Data relating to each interval of time comprise functioning parameters concerning a respective operation state of said machine.

The invention can be better understood and carried out with reference to the attached drawings, that illustrate an exemplifying and non-restrictive embodiment thereof, wherein.

Figure 1:
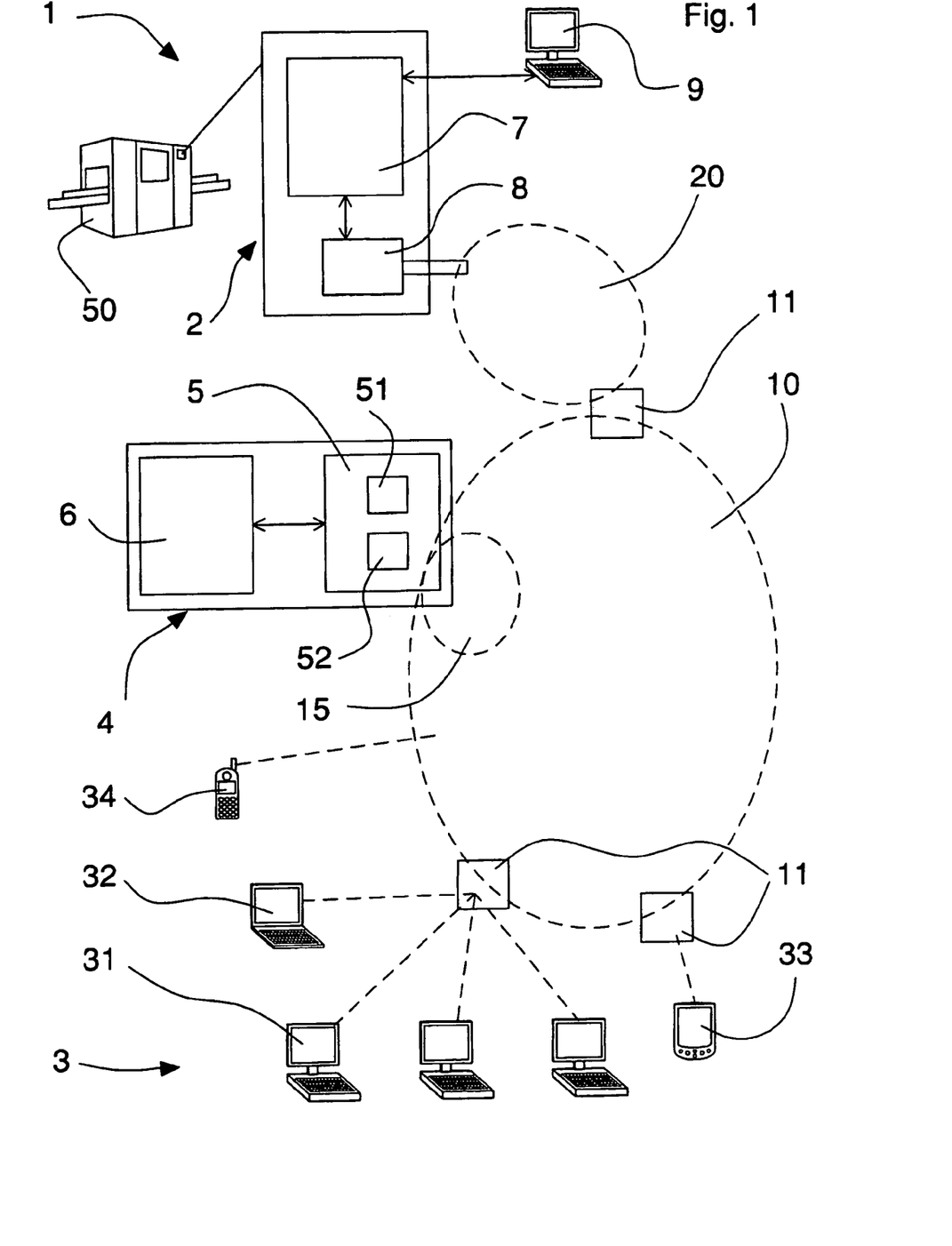
FIG. 1 is a schematic view of the system of the invention for transmitting and remotely managing data of a machine.

With reference to FIG. 1, a system 1 is shown for transmitting and remotely managing data of a machine 50, in particular operating and functional data of an automatic or semi-automatic packaging machine for wrapping with film or of extensible and/or heat/shrinking plastic material or a wood working machine tool.

The system 1 comprises a processing and exchanging data device 2 of the machine 50, communicating with a remote processing arrangement 3, through a first communication network 10 and by an intermediate processing device 4, these also remote and interposed between said processing and exchanging data device 2 and said remote processing arrangement 3 for enabling transfer of said data between this latter.

The processing and exchanging data device 2 comprises a control device 7 capable of executing an operating program for actuating the machine and processing digital and analogic signals coming from sensors and directed to actuators of said machine.

The system comprises an interface device 9 of known type and comprising for example a keyboard with monitor or a touch screen, connected to the processing and exchanging data device 2 for enabling a user to interact with this latter.

The processing and exchanging data device 2, which controls the operation of the machine 50 through the control device 7, can enable an user to select, according to its own discretion, a plurality of significant parameters relating to operation and productivity of the machine, that are to be sent to the intermediate processing device 4. In particular, the processing and exchanging data device 2 allows to elaborate and to exchange with the intermediate processing device 4 data individually, or in groups or packets according to different structures.

The data to be transferred typically comprises identifying machine number (IMEI code), actuator operating parameters, analogic or digital signals of sensors, alarm and/or anomaly and/or error signals, physical parameters (temperature, pressure), analogic values, etc. Such data define precisely and completely the instantaneous state of the machine, i.e. the operating and producing conditions thereof at any instant of its operating life. In other words said data form machine memory imagines of the machine operation.

The processing and exchanging data device 2 comprises a transceiver device 8 such as a modem unit, digital or analogic, or a router or another equivalent device, through which said data can be sent and received. In particular, the transceiver device 8 allows a connection to the first external communication network 10 and, through this latter, to the intermediate processing device 4.

The control device 7 and the transceiver device 8 are integrated in a single unit. In this case, an internal processing unit of the modem unit 8 is common to said control device 7. The processing unit of the modem unit 8 besides providing functions strictly related to connection and data exchanging, also controls operation of the machine, for example via a Real-Time Operating System, sensors and actuators of the machine being controlled through a I$^2$C bus. The interface device 9 may also be connected with said processing unit. Such a solution is very advantageous both in terms of space and in terms of costs.

In a version of the system not shown in Figures, the control device 7 comprises a programmable logic controller (PLC) or a personal computer (PC) or, in the case of machines having more simple and elemental operation, a non-programmable control device such as, for example, actuating switches, selectors, sequencers, timers, relay.

The processing and exchanging data device 2 may as well comprises a satellite localising or positioning device, known and not shown, for example comprising a GPS (Global Positioning System) receiver.

Figure 2:
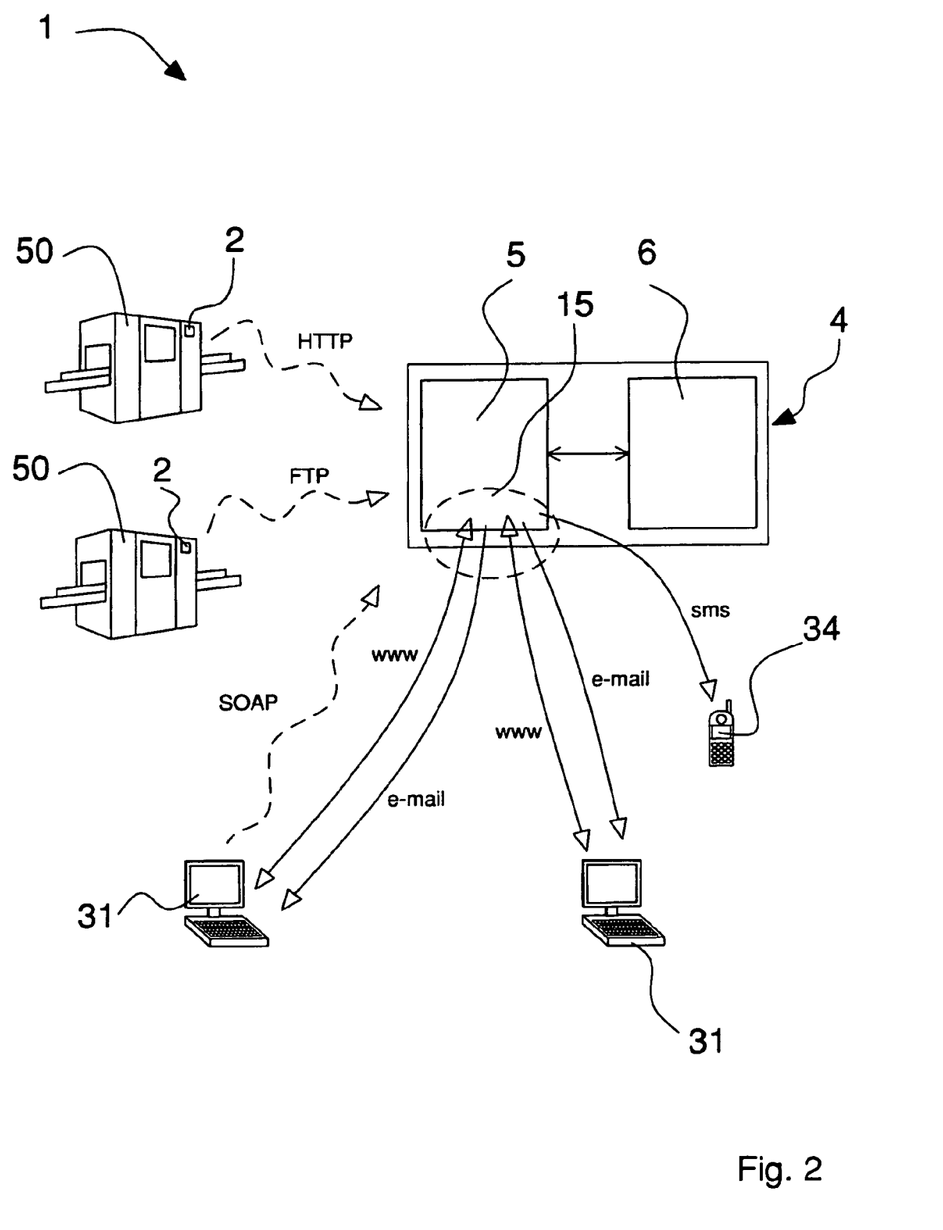
FIG. 2 is a schematic view of the system of FIG. 1 associated with a plurality of machines and a remote processing arrangement.

The remote processing arrangement 3 comprises a plurality of processing and/or communication units, fixed or mobile, such as fixed computers 31, portable computers or notebook 32, palmtop or PDA 33, mobile phones 34. Said processing and/or communication units enable the different users, such as end customers, technicians of maintenance service and spare parts service, commercial distributors of the machines, machine manufacturing companies, etc. to interact with the system 1, i.e. to access and exchange data with the intermediate processing device 4 and then with the processing and exchanging data device 2 of the machine 50.

In the system 1 the first communication network 10 is the Internet web and the intermediate processing device 4 comprises a web server device 5, i.e. a server computer or at least a server program resident on a computer, capable of furnishing a web page or web site 15 and sending and receiving data and information transported by the Internet through known standard protocols of transmission. The intermediate processing device 4 comprises, furthermore, a storing arrangement 6 consisting of a database, in which data sent by the processing and exchanging data device 2 and by the remote processing arrangement 3 can be saved.

The database 6 can be realised, for example, with an SQL (Structured Query Language) compatible software, a standard language for querying the databases, which language enables the data in the database to be looked at, modified, inserted, extracted independently from the software and the operating system with which the database was created.

The data in the database 6 can be displayed on the web site 15 according to layouts and methods specifically required. In particular, data access to the web site 15 can be controlled by means of known methods and systems suitable for defining different access levels for users, for identifying users and for preventing intrusions and unauthorised accesses.

By using the Internet 10 as first communication network, data can be exchanged between the processing and exchanging data device 2 and the intermediate processing device 4, through available different data transmission channels, such as protocols HTTP, SOAP, FTP, SMTP, POP3, etc.

HTTP protocol (HyperText Transfer Protocol) allows data to be transferred in hypertext format. Since the HTTP traffic is anonymous and in clear text, in order to assure different levels of security, protected versions of the protocol HTTP (SHTTP, HTTPS) may also be used, or the HTTP tunneling may be used, that enables private data to be transmitted through the web, like the VPN, a tunnel in Internet suitable for passing data on Internet without other users can read the information. Data encrypting can also be obtained by using specific software programs, commercially available.

SOAP protocol (Simple Object Access Protocol) is a "light" protocol that works on HTTP, for exchanging messages between software components.

FTP protocol (File Transfer Protocol) makes possible to transmit files between two systems both in "plain" or extended format and in compressed format, for reducing their dimensions and thus minimise the transmission time at parity of transmission speed.

The connection of the transceiver device 8 to the first communication network 10 can be made by using a second communication network 20, comprising a mobile phone network of the type functioning, for example, with the present technologies or standards GSM (Global System for Mobile Communication), GPRS (General Packet Radio Service), EDGE (Enhanced Data for GSM Evolution), UTMS (Universal Mobile Telecommunications System), etc.

In this case, the transceiver device 8 comprises a wireless modem (GSM, GPRS, EDGE, UMTS), which can be connected with the Internet 10 without requiring wires or dedicated, expensive phone lines. The wireless modem 8 enables a direct connection with an access arrangement 11 of the Internet 10, consisting of one or more connection points POP (Point of Present) of an Internet provider (ISP), that is a commercial structure or organisation offering to users the access to Internet and services thereof.

Owing to the data transmission speed allowed by the communication network 20, mainly by the GPRS, EDGE and UMTS networks, a remarkable amount of data and also movie and audio records can be transmitted to the web server 5 of the intermediate processing device 4, through respective web cameras and microphones, for example for more exhaustive analysis of machine functioning.

The connection with the Internet 10 from the remote processing arrangement 3 can be made with known techniques, for example by modems or routers enabling connection with POP connection points of Internet provider 11.

Similarly, the data transmission between remote processing arrangement 3 and the intermediate processing device 4 can be realised by using the known data transmission channels, for example the protocols HTTP, SOAP, FTP, SMTP, POP3, etc.

The web server 5 is further capable of directly communicating with the remote processing arrangement 3 via e-mail or via SMS (Short Message Service). In the first case, the web server 5 uses the Internet and, for example, the transmission protocol SMTP, POP3 for sending a text message to one or more of the fixed processing units 31 or the mobile units 32, 33. In the second case the web server 5 uses a mobile telephone network (GSM, GPRS, etc.) for sending short text messages to mobile phones 34 of the remote processing arrangement 3.

In general, the transmission of any message and/or communication from the system 1 to a user employing the remote processing arrangement 3, is subjected to the availability of communication channels for the user (e-mail, SMS, fax) and to the dimensions of the message, said dimension can be properly specified in order to decide of sending said message through free channels (e-mail) or through pay channels (SMS, fax). The notifications of machine anomalies or failures to the service technicians, the management of service requests, the interaction of the system with the technicians for closing the service requests are performed via SMS or via e-mail.

Therefore, the system 1 of the invention enable a communication with one or more machines 50 to be established, so that operating and manufacturing data of said machines 50 is acquired and stored in the database 6.

The data are exchanged at least between the processing and exchanging data device 2 and the intermediate processing device 4 by means of data groups or packets, for example in form of composition of structures. Each group or packet is sent in form of message or string, generally in binary format in order to reduce the dimension thereof, and it is identified, for example, by means of time and date of receiving/sending, identifying number of the machine that transmitted it (IMEI), predefined message code.

The packets or strings of data arriving to the web server 5 are saved directly in this format ("raw" data) in the database 6 for future processing.

The data packet are periodically sent by the processing and exchanging data device 2, according to defined intervals, for example every N seconds, where N is an integer number defined on the base of the specific use requirements.

For each interval of time corresponding data comprise all the functioning parameters concerning a respective instant of operation of the machine 50, namely a respective operation state of the machine.

In this way, the processing and exchanging data device 2 may operate without requiring a memory device for saving data before transmitting, so as to simplify system operation and cost.

It is also possible, to temporary save said data in the memory device of the processing and exchanging data device 2 in order to transmit at each interval of time data concerning a corresponding operation interval of said machine 50 having duration N.

The totality of all saved data in the database 6 allows establishing states of the machine at different instants and/or intervals of the machine operating life.

The data packet may be in HTML (Hyper Text Markup Language) format or in XML (Extensible Markup Language) format, in which case the web server 5 comprises an analysing program 51, typically consisting of a "parser" program executing the "parsing" of the packet or string, i.e. an analysis process of this latter in order to decode structure and composition of the data in term of elementary information, so as to form a table or set of parameters, suitable for being stored in the database 6 in the form of historical data.

Each machine state is thus defined by a set of data, each table of variables and parameters saved in the database 6 representing a specific "images" (m.i.m "machine memory images") of the state of the machine. In this way, the instantaneous state of a machine can be always rebuilt, starting from the image of a preceding state and applying all the variations of the variables up to the instant of interest.

The web server 5 further comprises a diagnostic module 52, typically consisting of a program capable of analysing the machine state and the communication state of the machine.

The machine state, which is defined by the respective set of functioning parameters, is directed to establish proper operation of the machine, possible begin of conditions of anomaly, alarm, caution. This type of diagnosis is performed by the diagnostic module 52 by means of specific algorithms, different according to the machine model, that compare the set of operating parameters of the machine with a plurality of predefined setting parameters, saved in database 6 and defining, for example, correct operation of the machine, conditions of anomaly and alarm, limits of intervention, component duration, etc. By such analysis and comparison, a web server device 5 can establish the machine state and, when necessary, can generate and send anomaly and malfunction reports, requests for technical service, requests for substituting pieces or components to a spare part store.

The analysis of communication of the machine has the object of verifying and establishing the proper operation of the modem unit 8 and, in general, of the whole flow of communication data from the control device 7 of the machine 50 to the intermediate processing device 4. This analysis operates according to some predefined criteria. For example, the processing and exchanging data device 2 of the machine 50 periodically sends data to the intermediate processing device 4, which verifies their reception. The unsuccessful reception of said data for a predefined period of time (time-out) indicates that the machine 50 is not capable of communicating or is stopped. In that case, the system, through the diagnostic module 52, generates and transmits an alarm signal, for example to the authorised remote processing arrangement 3. The period of time for this check is greater than the time interval between two successive data transmissions of the processing and exchanging data device 2.

The communication malfunctions of the machine are also saved in the database 6, and the respective data are included in an archive of machine historical data.

The system of the invention enables on the one hand periodical interventions of preventive maintenance to be correctly programmed, on the other hand a so-called "pro-active" maintenance to be realised, that allows to operate when conditions arise that may lead, within short times, to a machine stop, as the anomaly conditions can be detected and immediately transmitted to the technical service.

Besides this, if the machine stops, the system 1 enables service technicians to view all the functioning parameters of the machine useful for carry out an appropriate service intervention. In addition to identifying data of the machine (registration number, customer, location), parameters also can be obtained defining and identifying stop causes and indicating possible spare parts necessary for repair.

The system further provides to manage the intervention calls for technical service. For example, as a result of an intervention call directly coming from a machine 50 or from a user through a fixed processing unit 31 or mobile unit 32, 33, the web server device 5 can generate a signal via SMS or via e-mail for the respective service technicians. The request can be also shown on the web site 15 and related with the generating event. Technicians can follow, via SMS messages or via the web site 15, an evolution of the intervention request from opening to closing thereof.

Information and data can be sent from the remote processing arrangement 3 to the intermediate processing device 4 with the purpose of being transferred to the processing and exchanging data device 2. Thus, from a remote processing unit 31, for example a service unit of a machine manufacturing company, it is possible to send changes and updates of a control program of the control device 7 of the machine 50 and/or variations of setting and operating parameters of said machine.

These updating data are received by the web server device 5 and saved in the storing arrangement 6. The webs server device 5 can manage different releases of the control program, fit for different machines. Each group of data or new release is sent from the web server device 5 to the processing and exchanging data device 2 that requires software updating.

Figure 3:
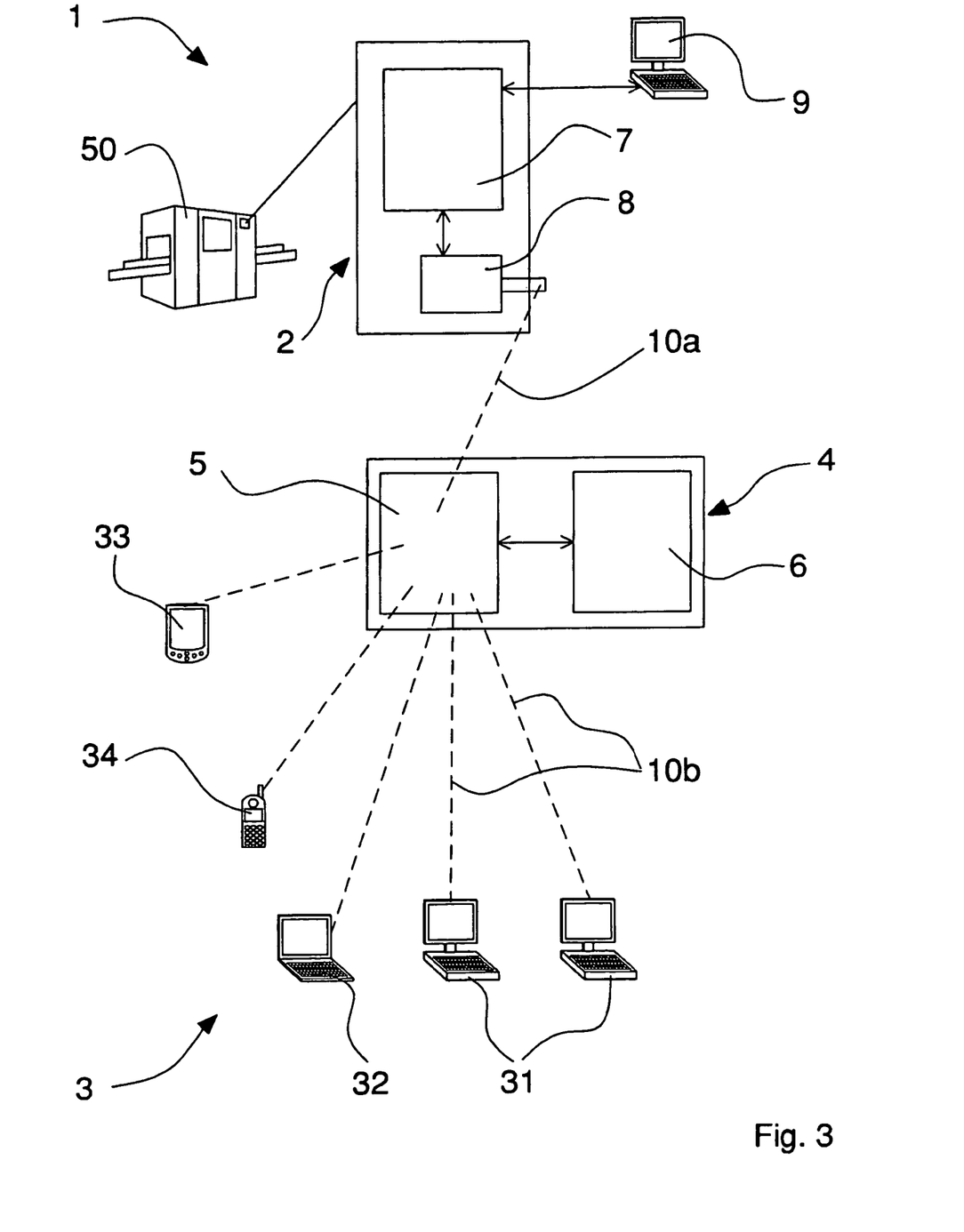
FIG. 3 is a schematic view of a version of the system of FIG. 1.

FIG. 3 shows a version of the system 1 for transmitting and managing data wherein the first communication network 10 comprises a first private communication line of point-to-point type 10a connecting the processing and exchanging data device 2 with the intermediate processing device 4 and second private communication lines of point-to-point type 10b connecting the remote processing arrangement 3 with the intermediate processing device 4.

The first communication line 10a and the second communication lines 10b are, for example, private phone or communication lines of analogic or digital type, with cables and satellites.

The processing and exchanging data device 2 is configured so as to transmit through modem unit 8 data relating to instants and/or functioning time intervals of said machine 50. Such data substantially comprise parameters that are significant and capable of precisely and exhaustively defining the machine state and/or the functioning of said machine 50 at determined instants and/or intervals of its life. The modem unit 8 sends said data, for example, at regular and predefined intervals of time and in the form of packets or groups or strings. Any group contains data relating to a specific functioning instant of the machine 50, for example the instant at which said group is sent. In this case, the processing and exchanging data device 2 executes a sort of data sampling, said data being periodically or explicitly on demand extracted and then transmitted.

Alternatively, any group may contain data relating to a correspondent time interval of functioning of the machine 50, for example a time interval included between two consecutive transmissions. In this case, the processing and exchanging data device 2 stores continuously the data, said data being split and sent in form of separated groups.

The data of the machine can be summarily divided, for example, in the following classes:
  data identifying the machine;
  data relating to machine start/stop, motors running/stopped (hours of working cycle; hours of manual cycle; hours of machine in stand-by; hours of machine off);
  data relating to parameters of machine cycle, parameters of machine configuration, digital/analogic input/output, machine states, alarm history;
  data relating to reproduction of a machine control panel (keyboard);
  data relating to alarms.

The following tables report a list, exemplifying and non-restrictive, of functioning variables and parameters of the machine, divided according to above defined classes.

TABLE A

IDENTIFICATION VARIABLES OF THE MACHINE

| Variable | Description |
| --- | --- |
| BYTE IDMachine | ID Machine |
| BYTE IDFunct | ID Functioning |
| BYTE IDCategory | ID Category |
| BYTE IDCompany | ID Company |
| BYTE IDCustomer | ID Customer |
| BYTE IDDistrib | ID Distributor |
| BYTE RevHW[5] | Revision HW |

TABLE A-continued

IDENTIFICATION VARIABLES OF THE MACHINE

| Variable | Description |
| --- | --- |
| BYTE RevSW[5] | Revision SW |
| BYTE CAL[5] | CAL Code |
| BYTE TestDate[8] | Test Date at factory |
| BYTE TesterCod[5] | Tester Code |
| BYTE InstallationDate[8] | Installation Date |
| BYTE InstallerCod[5] | Installer Code |
| BYTE SurveyPeriod | Survey period(m) |
| BYTE CodNumber[6] | Code Number |
| UDINT Latitude | Latitude |
| UDINT Longitude | Longitude |

TABLE B

| Variable | Variable description |
| --- | --- |
| MACHINE CYCLE PARAMETERS | |
| USINT Par_3[4] | Configuration value 0, 1, 2, 3 key parameter 3 (Setting Key of drive speed) |
| USINT Par_4[4] | Configuration value 0, 1, 2, 3 key parameter 4 (Setting key of pre-stretching(PFS, FS) or stretching(FR)) |
| USINT Par_7[4] | Configuration value 0, 1, 2, 3 key parameter 7 (Setting key of band number at base of pallet) |
| USINT Par_8[4] | Configuration value 0, 1, 2, 3 key parameter 8 (Setting key of band number at top of pallet) |
| USINT Par_10[4] | Configuration value 0, 1, 2, 3 key parameter 10 (Setting key of reinforcing bandage distance) |
| USINT Par_11[4] | Key value 0, 1, 2, 3 key parameter 11 (Setting key of carriage ascent speed) |
| USINT Par_12[4] | Configuration value 0, 1, 2, 3 key parameter 12 (Setting key of carriage descent speed) |
| USINT Par_13[4] | Configuration value 0, 1, 2, 3 key parameter 13 (Setting key of offset from ground) |
| USINT Par_14[4] | Configuration value 0, 1, 2, 3 key parameter 14 (Setting key of carriage stop delay/base height) |
| USINT Par_16[4] | Configuration value 0, 1, 2, 3 key parameter 16 (Setting key of film tension sensitivity (PFS)) |
| USINT Par_17[4] | Configuration value 0, 1, 2, 3 key parameter 17 (Selection key ascent/descent cycle or cycle only ascent or only descent) |
| USINT Cycle_select[4] | Configuration value 0, 1, 3, 2 Cycle_select (type of cycle selected) |
| USINT Fotoc_select[4] | Configuration value 0, 1, 3, 2 Fotoc_select (cycle photocell/altimeter) |
| USINT F1_select[4] | Configuration value 0, 1, 3, 2 F1_select (special cycle selection F1) |
| USINT lock_select | lock_select(flag of keyboard lock) |
| USINT n_prog_select | n_prog_select(program running) |
| MACHINE CONFIGURATION PARAMETERS (internal setting and enabling optional) | |
| USINT Conf_par1[4] | Actual value, min, max, increment "enabling film failure alarm" |
| USINT Conf_par2[4] | Actual value "enabling film cutting" |
| USINT Conf_par3[4] | Actual value, min, max, increment "carriage type selection (1 = FRD; 2 = FR; 3 = FS; 4 = PFS)" |
| USINT Conf_par4[4] | Actual value, min, max, increment "enabling continuous beeper" |
| USINT Conf_par5[4] | Actual value, min, max, increment "enabling U.S.A. display" |
| USINT Conf_par6[4] | Actual value "Vmax friction" |
| USINT Conf_par7[4] | Actual value, min, max, increment "enabling edgecount alarm" |
| USINT Conf_par8[4] | Actual value, min, max, increment "cycle ascent height F1" |
| USINT Conf_par9[4] | Actual value, min, max, increment "photocell filter" |
| USINT Conf_par10[4] | Actual value, min, max, increment "cylinder diameter" |
| USINT Conf_par11[4] | Actual value, min, max, increment "friction intervention delay" |

TABLE B-continued

| Variable | Variable description |
|---|---|
| FILM DATA (cycle counter) | |
| UINT Data_1 | Partial number counter of performed cycles |
| UDINT Data_2 | Total number counter of performed cycles |
| ALARM HISTORY | |
| UINT ErrorStack[0] | Last alarm |
| UINT ErrorStack[1] | Second last alarm |
| UINT ErrorStack[2] | Third last alarm |
| UINT ErrorStack[3] | Fourth last alarm |
| UINT ErrorStack[4] | Fifth last alarm |
| DIGITAL INPUT | |
| BYTE Input_base | Digital input reading * = DigIOGetBaseIn( ); |
| BOOL Start | Start key = Input_base & 0x1; |
| BOOL No_Stop | Stop key (NO) = Input_base & 0x2; |
| BOOL Reset | Reset key = (Input_base & 0x4); |
| BOOL No_carr_up | Carriage Selector Up (NO) = (Input_base & 0x8); |
| BOOL No_carr_down | Carriage Selector Down(NO) = (Input_base & 0x10); |
| BOOL Photocell | Photocell = (Input_base & 0x20); |
| BOOL NC | not connected * = (Input_base & 0x40); |
| BOOL Encoder_carr | Encoder Carriage = (Input_base & 0x80); |
| BYTE Exp_Input1 | Digital input reading expansion 1 connector J4 * = DigIOGetGpIn1( ); |
| BOOL Manual_forward | Exp_Input1 & 0x1; |
| BOOL Manual_backward | Exp_Input1 & 0x2; |
| BOOL Manual_ascent | Exp_Input1 & 0x4; |
| BOOL Manual_descent | Exp_Input1 & 0x8; |
| BOOL Edge | Exp_Input1 & 0x10; |
| BOOL Batt_on_charge | Exp_Input1 & 0x20; |
| BOOL Sens_film_break | Exp_Input1 & 0x40; |
| BOOL Cut_Exclus | Exp_Input1 & 0x80; |
| BYTE Exp_Input2 | Digital input reading expansion 2 J5 (SYNOPTIC)* = DigIOGetGpIn2( ); |
| BOOL NC | Exp_Input2 & 0x1; |
| BOOL Battery-charger alarm | Exp_Input2 & 0x2; |
| BOOL Emergency | Exp_Input2 & 0x4; |
| BOOL Carriage Motor Alarm | Exp_Input2 & 0x8; |
| BOOL Security Carter | Exp_Input2 & 0x10; |
| BOOL NC | Restrained to 1 = Exp_Input2 & 0x20; |
| BOOL Rotation Motor Alarm | Exp_Input2 & 0x40; |
| BOOL Bumper | Exp_Input2 & 0x80; |
| DIGITAL OUTPUTS | |
| BYTE Out_Base | |
| BOOL Out_Base1 | Power OFF |
| BOOL Out_Base2 | n/u |
| BOOL Out_Base3 | Brake releasing |
| BOOL Out_Base4 | EV Film Cut |
| BOOL Out_Base5 | n/u |
| BOOL Out_Base6 | n/u |
| BOOL Out_Base7 | n/u |
| BOOL Out_Base8 | n/u |
| BYTE Out_Bjt | |
| BOOL Out_Bjt1 | Buzzer |
| BOOL Out_Bjt2 | Flasher |
| BOOL Out_Bjt3 | n/u |
| BOOL Out_Bjt4 | n/u |
| BOOL Out_Bjt5 | n/u |
| BOOL Out_Bjt6 | n/u |
| BOOL Out_Bjt7 | n/u |
| BOOL Out_Bjt8 | n/u |
| ANALOGIC INPUTS | |
| BYTE V_Batt_cont | Continuing measuring of V_Batt * = AdcGetValue( ); |
| ANALOGIC OUTPUTS | |
| BYTE TractionSpeed | TRACTION SPEED |
| BYTE CarriageSpeed | CARRIAGE SPEED |
| BYTE ClutchTens | CLUTCH TENSION |
| BYTE FilmTension | FILM TENSION |

TABLE B-continued

| Variable | Variable description |
|---|---|
| | MACHINE STATES |
| BYTE Superv_step | SUPERVISOR CYCLE STATE<br>PARAMETERS<br>ALARM_HISTORY<br>STOP<br>SIREN<br>AUTOMATIC<br>MANUAL<br>ALLARMS<br>ALLARMS_SW<br>RESET<br>DATA<br>BATTERY-CHARGER |
| BYTE Step | MACHINE CYCLE STATE |
| BYTE Err_code | ALARM CODE<br>emergency button pressed alarm<br>bumper alarm<br>open carter alarm<br>alarm of brake drive motor inserted<br>drive motor alarm<br>carriage motor alarm<br>PFS motor alarm<br>counter-edge malfunction alarm<br>encoder carriage rising alarm<br>film breakage alarm<br>not enabled function alarm<br>battery-charger alarm<br>battery empty alarm |

TABLE C

| | CONTROL PANEL (KEYBOARD) |
|---|---|
| BYTE RobotKey1_8 | Cycle 1 programming key = RobotKey1_8 & 0x01<br>Cycle 3 programming key = RobotKey1_8 & 0x02<br>Driving speed setting key = RobotKey1_8 & 0x04<br>Pre-stretching (PFS, FS) or stretching (FR) Setting key = RobotKey1_8 & 0x08<br>Cycle 2 programming key = RobotKey1_8 & 0x10<br>Cycle 4 programming key = RobotKey1_8 & 0x20<br>Setting key of band number at base of pallet = RobotKey1_8 & 0x40<br>Setting key of band number at top end of pallet = RobotKey1_8 & 0x80 |
| BYTE RobotKey9_16 | Selection key cycle F1 (large dimensions load) = RobotKey9_16 & 0x01<br>Setting key of reinforcing bandage distance = RobotKey9_16 & 0x02<br>Setting key of carriage ascent speed = RobotKey9_16 & 0x04<br>Setting key of descent carriage speed = RobotKey9_16 & 0x08<br>Setting Key of ground offset = RobotKey9_16 & 0x10<br>Setting key of carriage stop delay/base height = RobotKey9_16&0x20<br>Production data display key = RobotKey9_16 & 0x40<br>Setting key of film tension sensitivity (PFS) = RobotKey9_16&0x80 |
| BYTE RobotKey17_21 | Selection key cycle ascent/descent or cycle only ascent or only descent = RobotLED17_19 & 0x01<br>n/u<br>Selection key of cycle insert sheet = RobotLED17_19 & 0x04<br>Key DECREMENT<br>Key INCREMENT<br>n/u<br>n/u<br>n/u |
| | LED BUTTONS |
| BYTE RobotLED1_8 | Cycle 1 programming LED = RobotLED1_8 & 0x01<br>Cycle 3 programming LED = RobotLED1_8 & 0x02<br>Drive speed programming LED = RobotLED1_8 & 0x04<br>Prestretching (PFS, FS) or stretching (FR) setting LED = |

TABLE C-continued

| | |
|---|---|
| | RobotLED1_8 & 0x08<br>Cycle 2 programming LED = RobotLED1_8 & 0x10<br>Cycle 4 programming LED = RobotLED1_8 & 0x20<br>Setting LED of band number at base of pallet =<br>RobotLED1_8 & 0x40<br>Setting LED of band number at top end of pallet =<br>RobotLED1_8 & 0x80 |
| BYTE Robot_LED9_16 | Cycle F1 selecting LED (large dimensions load) =<br>RobotLED9_16 & 0x01<br>Setting LED of reinforcing bandage distance =<br>RobotLED9_16 & 0x02<br>Setting LED of carriage ascent speed = RobotLED9_16<br>& 0x04<br>Setting LED of carriage descent speed = RobotLED9_16<br>& 0x08<br>Setting LED of ground offset = RobotLED9_16 & 0x10<br>Setting LED of carriage stop delay/base height =<br>RobotLED9_16 & 0x20<br>Display LED of production data = RobotLED9_16 &<br>0x40<br>Setting LED of film traction sensitivity(PFS) =<br>RobotLED9_16 & 0x80 |
| BYTE RobotLED17_19 | Cycle LED of ascent/descent = RobotLED17_19 & 0x01<br>Cycle LED of only ascent or only descent =<br>RobotLED17_19 & 0x02<br>Selection LED of cycle insert sheet = RobotLED17_19 &<br>0x04<br>=RobotLED17_19 & 0x08<br>=RobotLED17_19 & 0x10<br>=RobotLED17_19 & 0x20<br>=RobotLED17_19 & 0x40<br>=RobotLED17_19 & 0x80 |
| | SYNOPTIC LEDS |
| BYTE RobotLED22_29 | Motor alarm LED PFS = RobotLED22_29 & 0x01<br>Film breakage alarm LED = RobotLED22_29 & 0x02<br>Alarm LED of emergency button pressed =<br>RobotLED22_29 & 0x04<br>Alarm LED of motor carriage = RobotLED22_29 &<br>0x08<br>Alarm LED of carter open = RobotLED22_29 & 0x10<br>Alarm LED of drive motor brake inserted =<br>RobotLED22_29 & 0x20<br>Alarm LED of drive motor = RobotLED22_29 & 0x40<br>Bumper LED alarm = RobotLED22_29 & 0x80 |
| | BATTERY LEDS |
| BYTE RobotLED30_32 | Battery empty LED = RobotLED30_32 & 01<br>Battery medium LED = RobotLED30_32 & 02<br>Battery charged LED = RobotLED30_32 & 04<br>=RobotLED30_32 & 08<br>=RobotLED30_32 & 10<br>=RobotLED30_32 & 20<br>=RobotLED30_32 & 40<br>=RobotLED30_32 & 80 |
| DISPLAY | |
| BYTE DIGIT_U<br>BYTE DIGIT_T<br>BYTE DIGIT_H | |

TABLE D

MACHINE ALLARMS

| Category | Example | Description |
|---|---|---|
| starting message | Reset button wait, first operation to be activated, | |
| alarm button | button pressed | emergency alarm button pressed |
| physical protections | ports open, carters open | alarm bumper, carter open alarm<br>drive motor brake inserted alarm |

TABLE D-continued

| | | |
|---|---|---|
| thermal protections actuators/inverter protections | magnet thermal, inverter alarm, actuator overloading, | drive motor alarm |
| | | carriage motor alarm |
| | | motor PFS alarm |
| | | counter edge malfunction alarm |
| | | carriage rising encoder alarm |
| reading writing eprom/ CPU anomalies | eprom/CPU diagnostic reading error | |
| physical parameters out of range | furnace temperature to high, drive speed too low | |
| cycle anomalies/failure, film end | temperature not reached in time, carriage in extra stroke | film breakage alarm |
| not enable functions | pressed button not enabled, optional not enabled, | alarm function not enabled |
| diagnostics on the components | thermocouple broken, optical barrier not working, | battery-charger alarm |
| suppliers | CPU undersupplied | battery empty alarm |

ANALYSIS ALLARMS

| ALARM TYPE | Occurrence Nr. | Duration (min) |
|---|---|---|
| NO allarms | | |
| emergency button pressed alarm | | |
| alarm bumper | | |
| carter open alarm | | |
| drive motor brake inserted alarm | | |
| drive motor alarm | | |
| carriage motor alarm | | |
| motor PFS alarm | | |
| counter edge malfunction alarm | | |
| carriage rising encoder alarm | | |
| film breakage alarm | | |
| not enabled function alarm | | |
| battery charger alarm | | |
| battery empty alarm | | |

The system of the invention can be used on different typologies of machines, for example packaging machines and wood working machine tools.

Packaging machines comprise machines for processing loose products and machines for processing already packaged products.

Packaging machines for processing loose products comprise, for example, wrapping machines for application of shrinking film (shrink-wrapping machines), cartooning machines, taping and strapping machines, closing and sealing machines (cartoons, boxes, etc.).

Packaging machines for processing already packaged products comprise, for example, machines for wrapping and/or packaging groups of transiting products, "wraparound" machines, machines for fixing pallets and other loading units, packing machines, palletising machines and robots.

The wrapping machines comprise machines for completely wrapping the products, possibly on trays/boxes, with shrinkable or extendible film, packing machines with Kraft paper.

The machines for fixing pallets comprise vertical and/or horizontal wrapping/banding machines with extendible film, taping machines, strapping machines, stripping machines, bandaging machines, "Stretch hood" machines.

Figure 4:
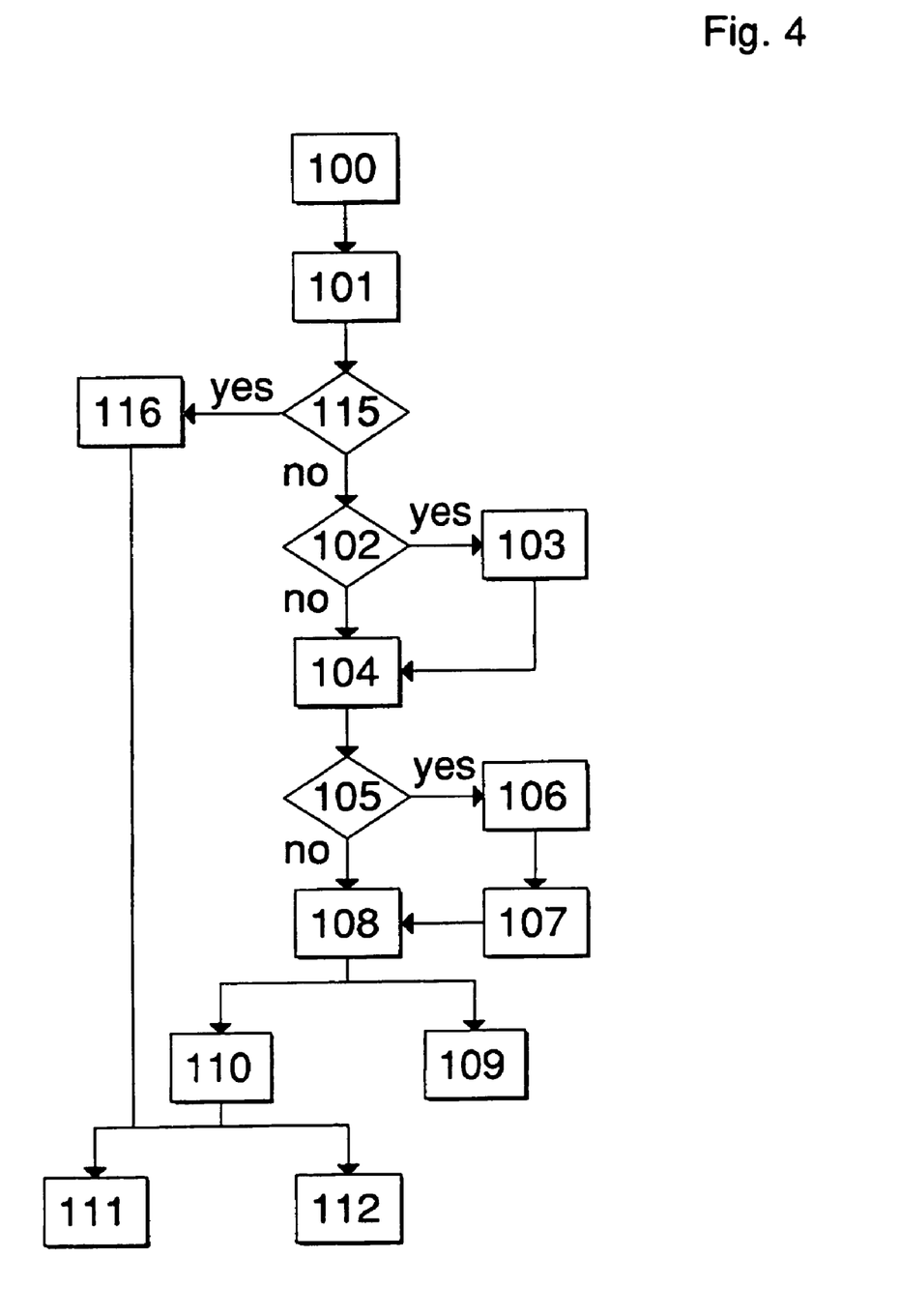
FIGS. 4 to 6 are flowcharts of methods for transferring and remotely controlling data of a machine.
Figure 5:
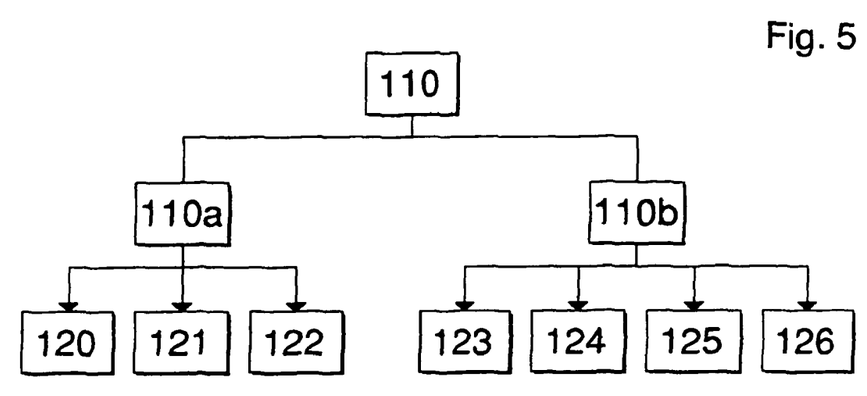
Figure 6:
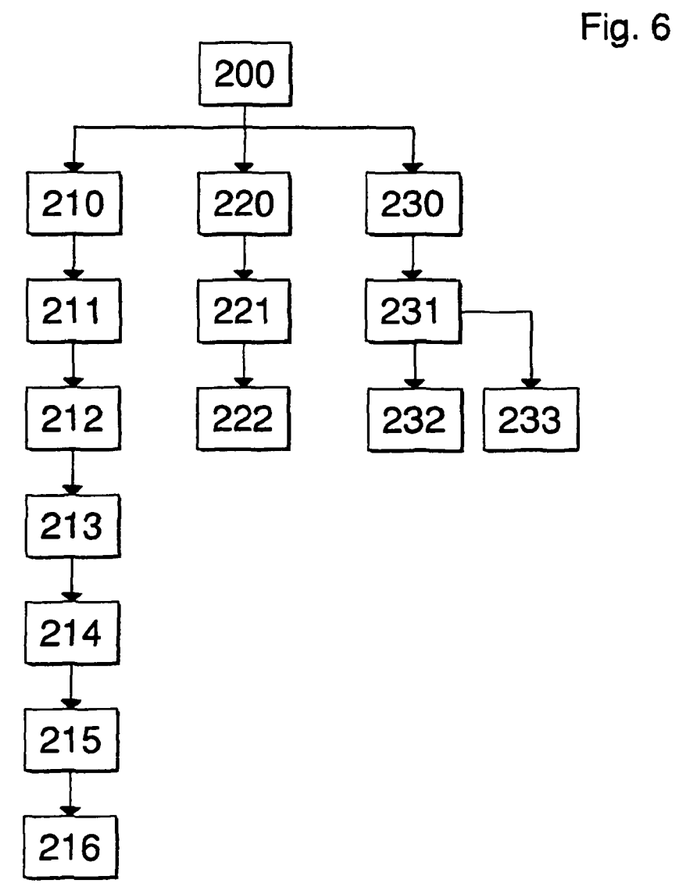

Wood working machine tools comprise, for example, multifunctional machines such as automated machining centers for sawing, routing, profiling, boring, sanding; work centers for hardware inserting, work centers for edgebanding, angular work centers and machines as router machines, boring machines, panel sizing machines, squaring edgebanding machines, edgebanding machines, calibrating machines, sanding machines, throughfeed automatic moulders, automatic tenoners, universal combined machines (6 functions), woodturning machines, mortiser machines, planing machines, spindle moulder machines. With reference to FIGS. 4, 5 and 6, respective flowcharts are shown relating to methods or procedures for transmitting and remotely managing data of an operating machine.

In particular, FIGS. 4 and 5 are flowcharts disclosing steps or phases of a procedure for transmitting and managing data sent by the processing and exchanging data device 2 of a machine 50 to intermediate processing device 4.

Such data transmission is executed at the starting step 100. Data in form of packets or strings are received by the web server device 5 of the intermediate processing device 4 at step 101. The web server device 5 verifies, at step 115, that data are sent periodically within a defined period of time (time-out). If at the end of said time-out data are not arrived to the web server device 5 from the processing and exchanging data device 2, an alarm signal is generated at step 116, which signal can be directly transmitted to the remote processing arrangement 3, at step 111, or displayed in the web site 15 of web server device 5, at step 112.

If data regularly arrives to the web server device 5, this latter, at step 102, verifies if said data are in "plain" or extended format or are in compressed format. If the data are not compressed, they are directly saved in the storing arrangement 6 as "raw" data at step 104; otherwise, before saving, said data are decompressed at step 103. At the subsequent step 105, the web server device 5 verifies if the data are coded, for example is they are in a structured format XML. In that case, at step 106, decoding or "parsing" of the data are provided in order to establish their structure and composition in elemental data, so that a set of parameters and variables is formed, suitable for being saved in the database 6 in form of historical data, at step 107.

At step 108, the data, eventually decoded, are analysed and compared with defined reference parameters and values also saved in the database 6.

Following such analysis and comparison the web server device 5 can generate specific messages and/or requests (Query) for users, at step 110. Such requests and signals can be directly sent to the remote processing arrangement 3, at step 111, and/or can be displayed in the web site 15, at step 112, display being available, for example, only to authorised users.

In parallel, at step 109, the data analysed and organised according to predefined modalities, can be made available on the web site 15, for a graphic display and/or for an aided navigation.

Flowchart of FIG. 4 comprises the following steps:
100 Data transmission from processing and exchanging data device 2 to web server device 5
101 Data reception by web server device 5
115 Timeout of data reception expired?
116 Alarm generation
102 Compressed data?
103 Data decompression
104 Storing of "raw" data on storing arrangement 6
105 Coded data?
106 Data decoding (parsing)
107 Saving decoded data on the database 6
108 Data analysis and comparison with pre-set parameters and values
109 Presentation of analysed data on web site 15
110 Generation of requests (Query)
111 Request transmission
112 Request display on the web site 15

In FIG. 5 a flowchart is shown specifying the different types of messages and request that the web server device 5 can generate following to analysis of data received from the processing and exchanging data device 2. At step 110a the web server device 5 generates commercial offers to be sent to commercial agents, at step 120, or to the customer owning the machine, at step 121. Said commercial offers can be also displayed on web site 15, at step 122, in predefined and reserved user areas.

In parallel, the web server device 5 can generate, at step 110b, a request of technical service to be sent, at step 123, directly to service technicians of machine manufacturing company, or to customer technicians, at step 124. The request for technical service may also be displayed on web site 15, at step 125, in a reserved user area and directly sent, at step 126, to spare parts store for a prompt request of substituting pieces or components. Flowchart of FIG. 5 comprises the following steps:
110a Commercial offers
110b Service intervention requests
120 Offer transmission to agents
121 Offer transmission to customers
122 Offer display on web site (Reserved user areas)
123 Intervention request transmission to service technicians
124 Intervention request transmission to customer
125 Intervention request display on web site 15 (Reserved user areas)
126 Transmission of request of spare parts to store FIG. 6 shows a flowchart comprising steps of a procedure for transmitting and remotely managing data sent by the remote processing arrangement 3 to the intermediate processing device 4 and reserved for processing and exchanging data device 2 of a machine 50. At step 200 remote processing arrangement 3 (remote user) are connected with the web server device 5, through the Internet 10, using known protocols of data transmission (HTML, FTP, SMTP, . . . ). The connection can be made for sending, at step 210, changes or updates of a control program of the control device 7 of machine 50 and/or for changing operating settings and/or parameters of the machine. Such changes define new releases of machine control program. Such updating data are received by the web server device 5 at step 211, and then saved in the storing arrangement 6, at step 212. The data are further analysed and organised, at step 213, by the web server device 5, that is capable of managing different software release, fit for different types of machines or for the same machines but of different customers.

The web server device 5, at step 214, sends changes to the processing and exchanging data device 2 requiring software updating or changes. The processing and exchanging data device 2 receives, at step 215, such updates that are implemented on the control program, at step 216.

The connection of the remote processing arrangement 3 with the web server device 5 can be used, at step 220, for sending a service call by a user, for example a customer detecting anomalies or problems on its own machine. The call is received and managed, at step 221, by the web server device 5 that generates, at step 222, an intervention request directed to service technicians, for example, of machine manufacturing company.

Alternatively, the connection can be made in order to enable a remote user to require, at step 230, functioning data of a particular machine, for example data relating to a specific operating time period of said machine. The request is received and processed, at step 231, by the web server device 5 that makes available the required data to the user on web site 15, at step 232, for example for a graphical representation or for their download through FTP protocol. Alternatively said data, at step 233, can be sent to user computer or device, through e-mail, or SMS text message.

Flowchart of FIG. 6 comprises the following steps:
200 Remote processing arrangement 3 is connected with web server 5
210 Transmission of updates for a control program of control device 7
211 Reception of updates by web server device 5
212 Saving updates on database 6
213 Data analysis and management (release)
214 Transmission of updates to processing and exchanging data device 2
215 Reception of updates by processing and exchanging data device 2
216 Updating of control program of control device 7
220 Transmission of service request from remote user with remote processing arrangement 3
221 Analysis and management of request by web server 5
222 Transmission of intervention request to service technicians
230 Request of machine state data from a remote user with remote processing arrangement 3
231 Reception of request by web server 5

232 Data display on web site 15
233 Data transmission to remote processing arrangement 3

The invention claimed is:

1. A system for transmitting and remotely managing data of a machine, comprising a modem unit of a processing and exchanging data device communicating with a remote processing arrangement, a processing unit of said modem unit transmitting and receiving data between said machine and the remote processing arrangement, and said processing unit of said modem unit controlling operation of said machine.

2. A system according to claim 1, wherein, via a first communication network, an intermediate processing device is interposed between said processing and exchanging data device and said remote processing arrangement so that transfer of said data between said processing and exchanging data device and said remote processing arrangement is achieved.

3. A system according to claim 1, wherein said first communication network is the Internet web.

4. A system according to claim 3, wherein said intermediate processing device comprises a web server device.

5. A system according to claim 4, wherein said web server device comprises an analysing program so configured as to analyse the content of any group of data in order to decode structure and composition of said data.

6. A system according to claim 1, wherein said data comprise coded functioning parameters of said machine.

7. A system according to claim 1, further comprising a second communication network connecting said processing and exchanging data device with said first communication network.

8. A system according to claim 7, wherein said second communication network is a mobile phone network.

9. A system according to claim 1, comprising an access arrangement by which said processing and exchanging data device and said remote processing arrangement are connectable to said first communication network.

10. A system according to claim 1, wherein said modem unit is configured so that said data are exchanged individually, or in groups.

11. A system according to claim 1, wherein said modem unit is configured so that said data are transmitted at intervals of time.

12. A system according to claim 11, wherein data transmitted at each of said intervals of time comprise functioning parameters concerning a respective operation state of said machine.

13. A system according to claim 11, wherein data transmitted at each of said intervals of time comprise functioning parameters concerning a corresponding interval of operation of said machine.

* * * * *